US008176489B2

(12) United States Patent
Bauer et al.

(10) Patent No.: US 8,176,489 B2
(45) Date of Patent: May 8, 2012

(54) USE OF ROLLBACK RCU WITH READ-SIDE MODIFICATIONS TO RCU-PROTECTED DATA STRUCTURES

(75) Inventors: Robert T. Bauer, Beaverton, OR (US);
Paul E. McKenney, Beaverton, OR (US); Paul F. Russell, Queanbeyan (AU)

(73) Assignee: International Business Machines Corporation, Armonk, NY (US)

( * ) Notice: Subject to any disclaimer, the term of this patent is extended or adjusted under 35 U.S.C. 154(b) by 1899 days.

(21) Appl. No.: 11/009,220

(22) Filed: Dec. 9, 2004

(65) Prior Publication Data

US 2006/0130061 A1 Jun. 15, 2006

(51) Int. Cl.
*G06F 9/46* (2006.01)
*G06F 13/00* (2006.01)

(52) U.S. Cl. ........ 718/100; 718/104; 718/108; 711/147; 711/155

(58) Field of Classification Search .................. 718/100, 718/102, 104, 108; 714/38; 711/141, 147
See application file for complete search history.

(56) References Cited

U.S. PATENT DOCUMENTS

| | | | |
|---|---|---|---|
| 5,410,697 A | | 4/1995 | Baird et al. |
| 5,442,758 A * | | 8/1995 | Slingwine et al. ............ 1/1 |
| 5,490,270 A | | 2/1996 | Devarakonda et al. |
| 5,574,874 A | | 11/1996 | Jones et al. |
| 5,608,893 A * | | 3/1997 | Slingwine et al. ............ 711/141 |
| 5,727,209 A * | | 3/1998 | Slingwine et al. ............ 718/102 |
| 5,852,731 A * | | 12/1998 | Wang et al. .................. 718/100 |
| 6,006,247 A * | | 12/1999 | Browning et al. ............ 718/102 |
| 6,105,099 A * | | 8/2000 | Freitas et al. ................. 710/200 |
| 6,189,007 B1 * | | 2/2001 | Boonie et al. ................ 1/1 |
| 6,654,781 B1 | | 11/2003 | Browning |
| 6,668,310 B2 * | | 12/2003 | McKenney .................... 711/147 |
| 6,684,398 B2 | | 1/2004 | Chaudhry et al. |
| 6,697,834 B1 * | | 2/2004 | Dice ............................. 718/102 |
| 6,721,902 B1 | | 4/2004 | Cochran |
| 6,779,065 B2 * | | 8/2004 | Murty et al. .................. 710/260 |
| 6,785,888 B1 * | | 8/2004 | McKenney et al. ........... 718/104 |
| 7,178,062 B1 * | | 2/2007 | Dice ............................. 714/38 |
| 7,188,344 B1 * | | 3/2007 | Blue ............................. 718/106 |
| 7,191,098 B1 * | | 3/2007 | Brenner ....................... 702/186 |
| 7,395,383 B2 * | | 7/2008 | McKenney .................... 711/152 |
| 2004/0025160 A1 * | | 2/2004 | Dice et al. ..................... 718/102 |
| 2004/0088704 A1 * | | 5/2004 | Owen et al. .................. 718/100 |
| 2004/0205304 A1 * | | 10/2004 | McKenney et al. ........... 711/148 |
| 2005/0022186 A1 * | | 1/2005 | Accapadi et al. ............. 718/100 |

(Continued)

OTHER PUBLICATIONS

Joe Seigh ("System, RCU for preemptive user threads", Apr. 2004, pp. 1-2).*

(Continued)

*Primary Examiner* — Jennifer To
*Assistant Examiner* — Caroline H Arcos
(74) *Attorney, Agent, or Firm* — Lieberman & Brandsdorfer, LLC (57) ABSTRACT

A method, apparatus and program storage device for performing a return/rollback process for RCU-protected data structures is provided that includes checking a user-level state of a preempted thread having a RCU read-side critical section, and executing the critical section of the thread after preemption when the user-level state of the thread indicates execution, otherwise returning to a point of preemption, resuming execution of the thread and disabling checking the user-level state when the user-level state of the thread indicates return.

16 Claims, 5 Drawing Sheets

U.S. PATENT DOCUMENTS

2005/0216633 A1* 9/2005 Cavallo .................. 710/260
2006/0037025 A1* 2/2006 Janssen et al. ............ 718/107

OTHER PUBLICATIONS

McKenney et al. ("Read copy update", 2002, Linux teachnology center, pp. 338-367.*
Arcangeli et al. ("Using read-copy update techniques for system V IPC in the Linux 2.5 Kernel", 2003, pp. 1-13.*
Andrea Arcangeli et al. ("Using Read-Copy-Update techniques for system V IPC in the Linux 2.5 Kernel", USENIX, 2003 annual technical conference, pp. 1-22).*
Brian N. Bershad ("Practical consideration for non-blocking concurent objects", 1993, IEEE, pp. 264-273.*
Jun. 2003, Arcangeli et al., "Using read-copy-update techniques for System V IPC in the Linux 2.5 kernel," FREENIX Track 2003 USENIX Annual Technical Conference, Proceedings, San Antonio TX, Jun. 9-14, 2003, 1 page.
Nov. 2001, Bertino et al, "A Nested Transaction Model for Multilevel Secure Database Management Systems," ACM Transactions on Information and System Security, vol. 4, No. 4, Nov. 2001, pp. 321-370.

* cited by examiner

USE OF ROLLBACK RCU WITH READ-SIDE MODIFICATIONS TO RCU-PROTECTED DATA STRUCTURES

BACKGROUND OF THE INVENTION

1. Field of the Invention

This disclosure relates in general to computer applications and more particularly to using rollback RCU with read-side modifications to RCU-protected data structures.

2. Description of Related Art

An operating system kernel is a piece of software responsible for providing secure access from a machine's hardware to various computer programs. The kernel also manages hardware access among a number of programs by deciding when and how long a program should be able to make use of a piece of hardware.

Operating system kernel technologies include read copy-update (RCU) that is used for improving performance on computers with more than one central processing unit (CPU). RCU provides a grace period to concurrent hardware accesses by performing destructive updates in two phases: 1) carrying out enough of each update for new operations to see the new state, while allowing pre-existing operations to proceed on the old state, then 2) completing the update after the grace period expires, so that all pre-existing operations have completed.

There have been a couple of ports of RCU to user-level code, but such straightforward ports are subject to memory exhaustion if one of the processes is preempted indefinitely outside of a quiescent state, which is a thread-execution state during which no references to any RCU-protected data structures are held. Some operating systems permit user processes to suppress preemption, but such suppression is often treated as a hint. Furthermore, not all operating systems provide preemption suppression to user-level processes, with Linux being a prominent case in point. Proposals have been made for having preemption events "roll back" execution to the beginning of an RCU read-side critical section. A critical section is a piece of code that can be executed only by a restricted subset of processes. Critical sections are used to protect against local interrupts and operate on a per-CPU basis, guaranteeing that a thread currently being executed will not be preempted. For read-side critical sections, the region of code is protected from outside interference through some synchronization mechanism, but allows multiple concurrent readers. With regard to "roll back" execution, only read-only read-side critical sections are allowed, making it impossible to use this technique to look up a reference-counted data structure (for example). Note that it is necessary for a preempted thread to be considered to be in a quiescent state in order for RCU to be able to process future RCU callbacks in a timely fashion.

The problem is that the RCU read-side critical section must be idempotent for the proposed "roll back" execution approach to work correctly. If the read-side critical section is not idempotent, deadlock or excess reference counts can occur, resulting in application failure.

It can be seen that there is a need for a restart/rollback process for RCU-protected data structures that avoids deadlock without the requirement of an idempotent read-side critical section.

SUMMARY OF THE INVENTION

To overcome the limitations described above, and to overcome other limitations that will become apparent upon reading and understanding the present specification, the present invention discloses a method, apparatus and program storage device for performing a return/rollback process for read copy update (RCU) protected data structures.

In an embodiment of the present invention a program storage device includes program instructions executable by a processing device to perform operations for performing a return/rollback process for read copy update (RCU) protected data structures. The operations include determining a thread has been preempted and an exception signal has followed preemption allowing the process to resume, checking a user-level state of the thread before resuming the process, and restarting the RCU read-side critical section of the thread when user-level state indicates restart, else returning to a point of preemption, resuming execution and suspending checking of the user-level state when the user-level state indicates a rollback.

Another embodiment of the present invention is an apparatus for performing a rollback process for RCU-protected data structures. The apparatus includes a kernel including code for generating a signal enabling resumption of a thread after preemption from executing a critical section, and an exception handler for checking a user-level state on the thread before resumption of the thread, and for restarting a critical section when the user-level state of the thread indicates restart, else for returning to a point of preemption and suspending checking the user-level state when the user-level state of the thread indicates returning to the point of preemption.

In another embodiment of the present invention, a method for performing a return/rollback process for RCU-protected data structures is provided. The method including checking a user-level state of a preempted thread having a RCU read-side critical section, and executing the critical section of the thread after preemption when the user-level state of the thread indicates execution, else returning to a point of preemption, resuming execution of the thread and disabling checking the user-level state when the user-level state of the thread indicates return.

In another embodiment of the present invention, a system for performing a return/rollback process for RCU-protected data structures is provided. This system includes means means for determining a thread has been preempted and an exception signal has followed preemption allowing the thread to resume, means for checking a user-level state of the thread, and means for restarting the RCU read-side critical section of the thread when user-level state indicates restart, else returning to a point of preemption, resuming execution and suspending checking of the user-level state when the user-level state indicates a rollback.

In another embodiment of the present invention, an apparatus for performing a return/rollback process for RCU-protected data structures is provided. The apparatus includes means for providing a kernel including code for generating a signal enabling resumption of a thread after preemption from executing a critical section, and means for providing an exception handler for checking a user-level state on the thread before resumption, and for restarting a critical section when the user-level state of the thread indicates restart, else for returning to the point of preemption and suspending checking the user-level state when the user-level state of the thread indicates returning to the point of preemption.

In another embodiment of the present invention, a system for performing a return/rollback process for RCU-protected data structures is provided. This system includes means for checking a user-level state of a preempted thread having a RCU read-side critical section, and means for executing the critical section of the thread after preemption when the user-level state of the thread indicates execution, else returning to a point of preemption, resuming execution of the thread and disabling checking the user-level state when the user-level state of the thread indicates return. These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

An embodiment of the present invention provides a method, apparatus and program storage device that uses an exception handler for performing rollback read copy update (RCU) with read-side modifications to RCU-protected data structures.

Figure 1:
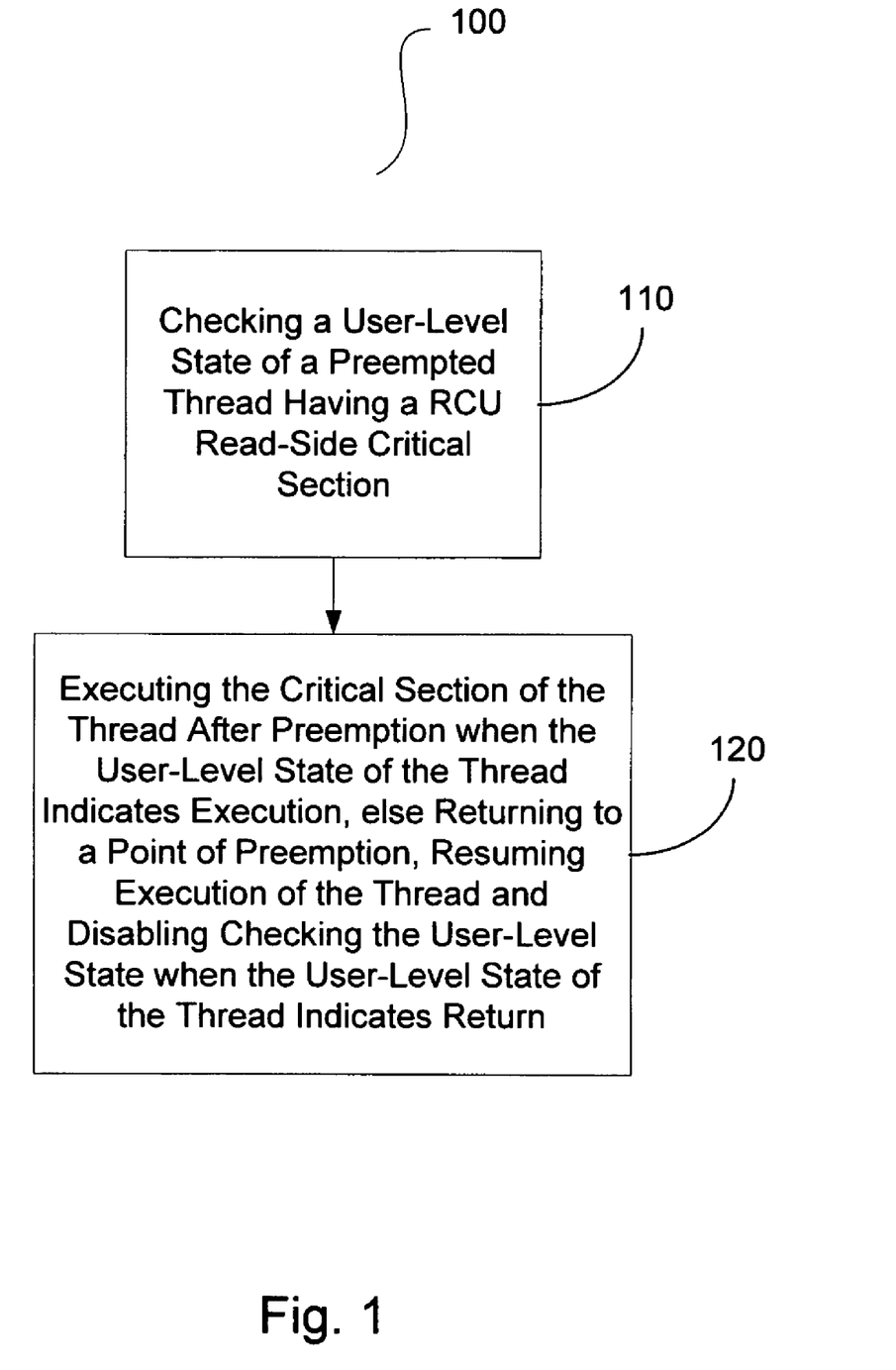
FIG. 1 illustrates a flowchart of a method an exception handler performs for a return/rollback process for read copy update (RCU) protected data structures in accordance with an embodiment of the invention.

FIG. 1 illustrates a flowchart of a method 100 an exception handler performs for a return/rollback process for RCU-protected data structures in accordance with an embodiment of the invention. The exception handler performs a method 100 that includes checking 110 a user-level state of a preempted thread having a RCU read-side critical section, and then executing 120 the critical section of the thread after preemption when the user-level state of the thread indicates execution, otherwise returning to a point of preemption, resuming execution of the thread and disabling checking the user-level state when the user-level state of the thread indicates return. A read-side critical section is a region of code whose access to shared memory are protected from outside interference, through the use of some synchronization mechanism, but which permits multiple concurrent readers. Such user-level critical sections are analogous to the rcu_read_lock( )/rcu_read_unlock( ) segments of code in the Linux kernel.

Figure 2:
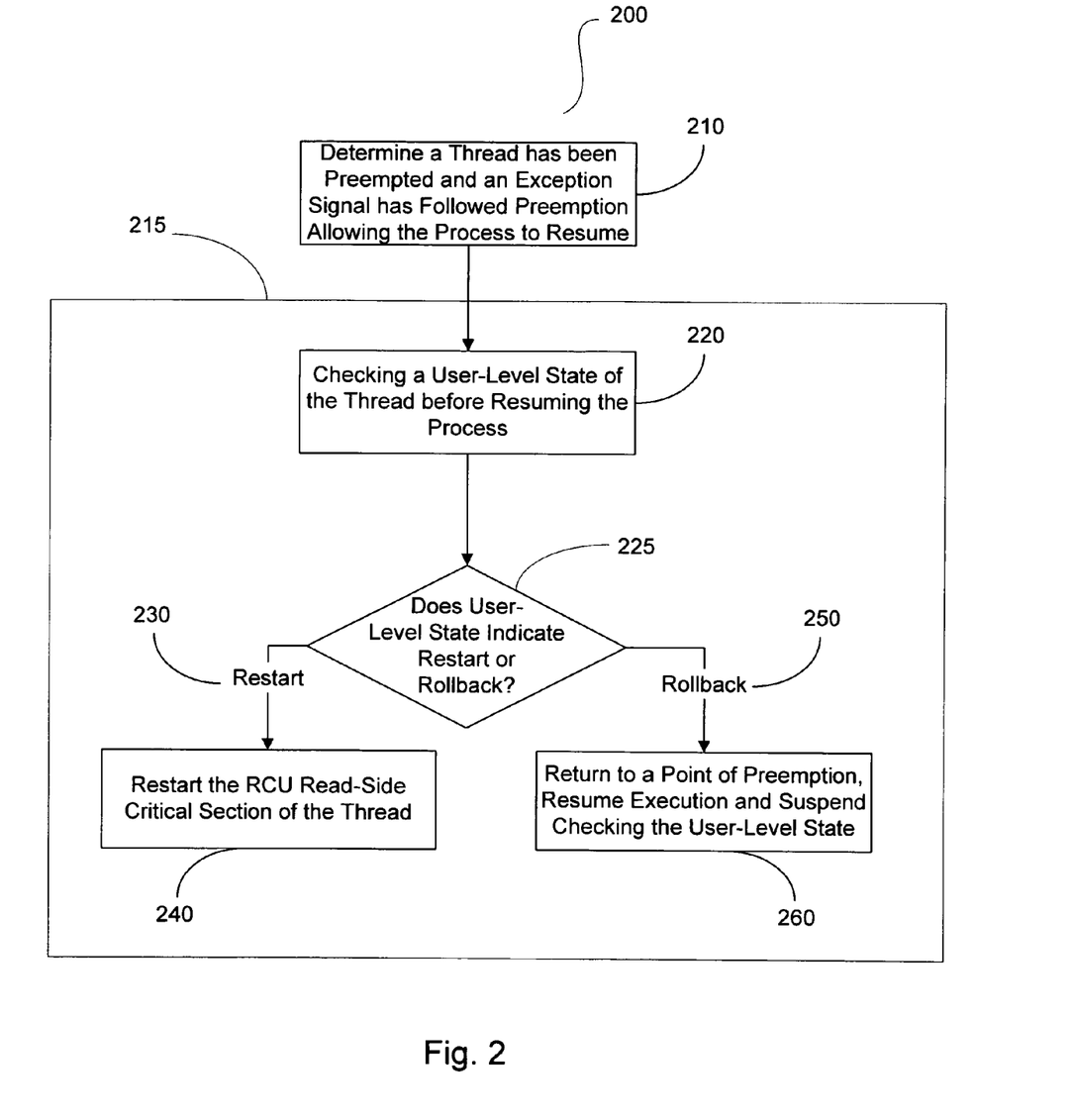
FIG. 2 illustrates a flowchart of a process to perform a return/rollback process for RCU-protected data structures in accordance with an embodiment of the invention.

FIG. 2 illustrates a flowchart of a process 200 for performing a return/rollback process for RCU-protected data structures in accordance with an embodiment of the invention. A determination 210 is made that a thread has been preempted, e.g., a signal handler is delivered to the thread by the kernel upon resumption of the thread's execution, and that an exception signal has followed preemption allowing the process to resume. The exception handler 215 checks 220 a user-level state of the thread is checked. The exception handler restarts 230 the RCU read-side critical section of the thread when the user-level state indicates 225 restart 230. Otherwise, the exception handler returns 260 the RCU read-side critical section to a point of preemption, resumes execution and suspends checking of the user level state when the user-level state indicates 225 a rollback 250.

Figure 3:
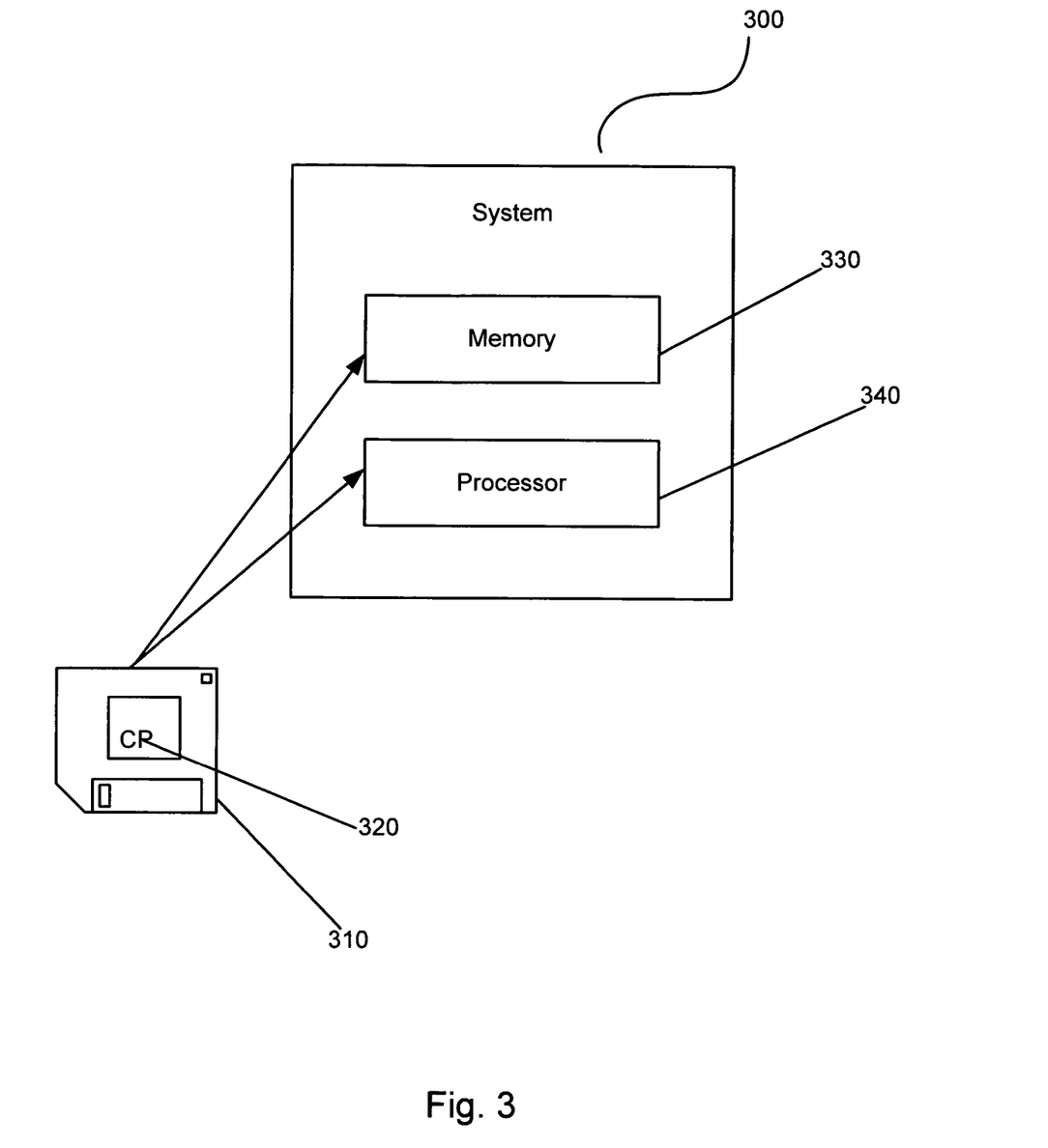
FIG. 3 illustrates a system according to the present invention, wherein the processes implementing an exception handler illustrated in FIGS. 1 and 2 may be tangibly embodied in a computer-readable medium, e.g. one or more of the fixed and/or removable data storage devices.

FIG. 3 illustrates a system 300 according to the present invention, wherein the processes implementing an exception handler illustrated in FIGS. 1 and 2 may be tangibly embodied in a computer-readable medium, e.g. one or more of the fixed and/or removable data storage devices 310. A computer program 320 expressing the processes embodied on the data storage devices 310 may be loaded into the memory 330 or into the system 300, e.g., in a processor 340, to configure the system 300 of FIG. 3 for execution. The computer program 320 comprise instructions which, when read and executed by the system 300 of FIG. 3, causes the system 300 to perform the steps necessary to execute the steps or elements of the present invention.

Figure 4:
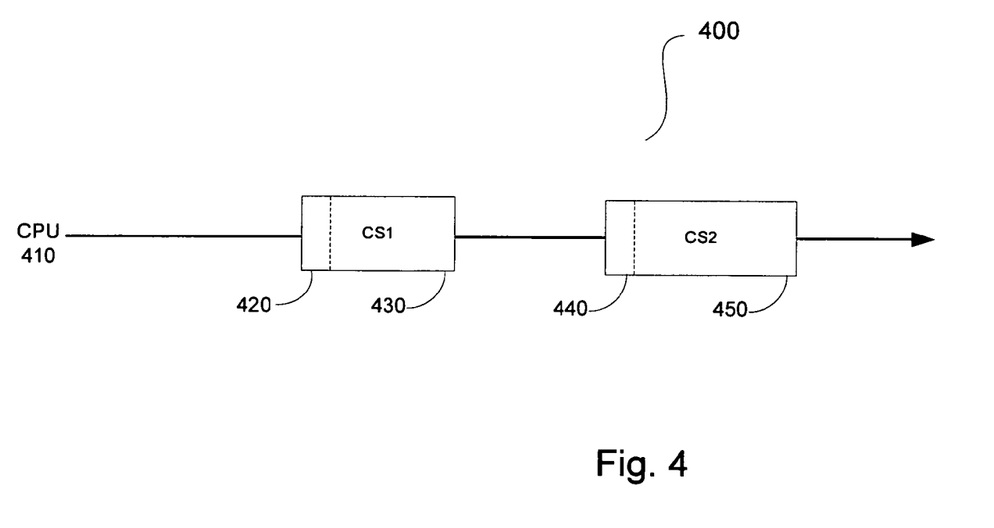
FIG. 4 illustrates an embodiment of the invention that includes an exception handler at the beginning of each RCU read-side critical section in hardware on CPU.

FIG. 4 illustrates an embodiment 400 of the invention that includes an exception handler 420, 440 at the beginning of each RCU read-side critical section 430, 450 in hardware on CPU 410. A kernel generates an exception or signal upon resuming a given process/thread after preempting it. The application cannot be permitted to execute even one instruction at user level before the signal/exception is processed. A signal is received at the user-level which will allow the critical section 430, 450 to be restarted. Before the critical section is restarted, the exception handler 420, 440 positioned at the beginning of each RCU read-side critical section checks a user-level state. For example, if the read-side critical section searched a linked list, and returned the desired element with a per-element lock held, the exception handler would check the lock, and restart only if the lock was not held by this thread. If the lock was held, the exception handler would simply return, so that execution resumed where the preemption occurred. Shortly after the lock is acquired, the application could disable the exception handler (perhaps by setting a per-thread variable sensed by the handler), so that future preemptions would have no effect. The exception handler 420, 440 checks user-level applications for locks in order to avoid extended execution outside of a quiescent state. Alternatively, the exception handler 420, 440 could make the resume/rollback decision based on the value of the program counter at the point where the preemption occurred.

It is necessary that a preempted thread be considered to be in an extended quiescent state. This could be provided via a system call or/proc entry that checked a particular thread or group of threads, since they would need to track the fact that they were to generate an exception upon wakeup.

Figure 5:
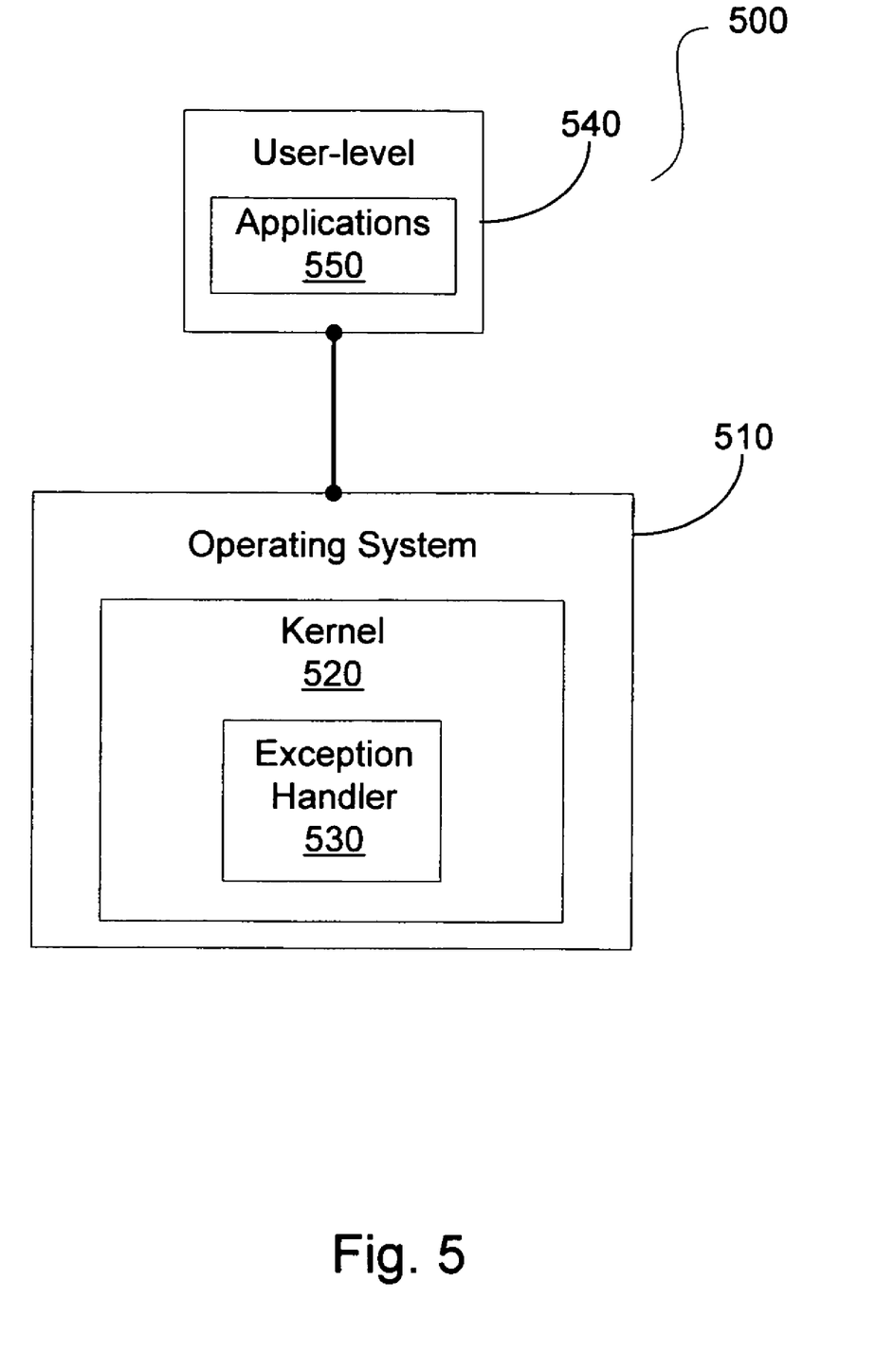
FIG. 5 is a block diagram of a software implementation in a data processing system that can operate with an exception handler in accordance with an embodiment of the invention.

FIG. 5 is a block diagram of a software implementation in a data processing system 500 that can operate with an exception handler in accordance with an embodiment of the invention. Operating system 510 holds kernel 520, and housed within kernel 520 is exception handler 530 software. The operating system 510 is communicatively coupled to user level 540 which houses application 550, for example. Kernel 520 generates a signal enabling conditional resumption of a thread after preempting it from executing a critical section. The exception handler 530 software checks a state of a user-level 540, and restarts a critical section when the user-level state of the thread indicates restart. Otherwise the exception handler 530 returns to the point of preemption and suspends checking the user-level state when the user-level 540 state of the thread indicates returning to the point of preemption.

The present invention is not meant to be limited to hardware or software embodiments. Rather, the exception handler of the present invention can be implemented in hardware, software or combinations thereof.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A program storage device, comprising:
   program instructions stored thereon, executable by a processing device to perform operations for performing a return/rollback process for a read copy update (RCU) read-side critical section that references an RCU protected data structure, the operations comprising:
      determining a thread executing an RCU read-side critical section has been preempted, wherein the determining comprises determining that the thread is in an extended quiescent state;
      an exception handler checking a user-level state of the thread to determine whether the thread holds a lock before resuming the thread, wherein the lock for a resource is acquired in the critical section of the thread; and
      rolling back the thread to a beginning of the RCU read-side critical section of the thread when the user-level state indicates restart in absence of the lock held by the thread, else when the user-level state indicates the thread holds the lock, returning to a point of preemption, resuming execution and suspending checking of the user-level state for the lock.

2. The program storage device of claim 1, wherein the operation of determining a thread has been preempted further comprising processing an exception signal while preventing the thread from executing instructions.

3. The program storage device of claim 1, wherein the operation of returning to the point of preemption when the user-level state indicates rollback and suspending checking of the user-level state further comprising returning to the point of preemption when the user-level state indicates the thread holds the lock and suspending checking of the user-level state.

4. The program storage device of claim 1, wherein the operation of checking the thread user-level state further comprising checking a value of a program counter at a point where preemption occurred.

5. The program storage device of claim 1, wherein the operation of suspending checking the user-level state further comprising setting a per-thread variable.

6. An apparatus for performing a return/rollback process for a read copy update (RCU) read side critical section that references RCU protected data structures, comprising:
   a processor in communication with memory;
   said processor to determine a thread executing an RCU read-side critical section has been preempted, comprising determining that the thread is in an extended quiescent state, and executing an exception handler for checking a user-level state on the thread to determine whether the thread holds a lock before resuming the thread, wherein the lock for a resource is acquired in the critical section of the thread; and
   said processor to roll back the thread to a beginning of the RCU read-side critical section when the user-level state of the thread indicates restart in absence of a lock held by the thread, else when the user-level state indicates the thread holds the lock, returning to a point of preemption and suspending checking the user-level state for the lock.

7. The apparatus of claim 6, wherein when the exception handler suspends checking by setting a per-thread variable.

8. The apparatus of claim 6, wherein the thread is a user-level thread.

9. The apparatus of claim 6, wherein the exception handler is positioned at the beginning of each RCU read-side critical section.

10. The apparatus of claim 6, wherein the signal indicating conditional resumption prevents the thread from executing instructions.

11. The apparatus of claim 6, wherein the exception handler rolls back to the point of preemption and suspends checking when the user-level state indicates the thread does not hold the lock.

12. The apparatus of claim 6, wherein the handler checks a value of a program counter at a point where preemption occurred.

13. A method for performing a return/rollback process for a read copy update (RCU) read side critical section that references RCU protected data structures, comprising:
   determining a thread executing an RCU read-side critical section has been preempted, wherein the determining comprises determining that the thread is in an extended quiescent state;
   checking, by an exception handler, a user-level state of the thread preempted in the RCU read-side critical section to determine whether the thread holds a lock before resuming the thread, wherein the lock for a resource is acquired in the critical section of the thread; and
   executing a roll back process to a beginning of the RCU read-side critical section of the thread after preemption when the user-level state of the thread indicates restart in absence of the lock held by the thread, else when the user-level state indicates the thread holds the lock, returning to a point of preemption, resuming execution of the thread and disabling checking the user-level state for the lock.

14. A computer program product for performing a return/rollback process for a read copy update (RCU) read side critical section that references RCU protected data structures, the computer program product comprising:
   a computer readable storage medium having computer readable program code embodied therewith, the computer readable program code comprising:
      means for determining a thread executing an RCU read-side critical section has been preempted, comprising determining that the thread is in an extended quiescent state, and an exception signal has followed preemption allowing the thread to resume;
      means for checking a user-level state of the thread for to determine whether the thread holds a lock before resuming the thread, wherein the lock for a resource is acquired in the critical section of the thread; and means for rolling back the thread to a beginning of the RCU read-side critical section of the thread when the user-level state indicates restart in absence of the lock held by the thread, else when the user-level state indicates the thread holds the lock, returning to a point of preemption, resuming execution and suspending checking of the user-level state for the lock.

15. An apparatus for performing a return/rollback process for a read copy update (RCU) read-side critical section that references RCU protected data structures, comprising:

a computer readable storage medium having computer readable program code embodied therewith, the computer readable program code comprising:

instruction for determining a thread executing a RCU read-side critical section has been preempted, wherein the determining comprises determining that the thread is in an extended quiescent state;

instructions for providing a kernel including code for generating a signal enabling resumption of the thread after preemption from executing the critical section; and instructions for providing an exception handler for checking a user-level state of the thread for a lock before resumption, wherein the lock for a resource is acquired in the critical section of the thread, and for rolling back the thread at to a beginning of the RCU read-side the critical section when the user-level state of the thread indicates restart in absence of the lock held by the thread, else when the user-level state indicates the thread holds the lock, for returning to a point of preemption and suspending checking the user-level state for the lock.

16. A system for performing a return/rollback process for a read copy update (RCU) read-side critical section that references RCU protected data structures, comprising:

a computer readable storage medium having computer readable program code embodied therewith, the computer readable program code comprising:

means for determining a thread executing an RCU read-side critical section has been preempted, wherein the determining comprises determining that the thread is in an extended quiescent state;

means for checking for a user-level state of the preempted thread to determine whether the thread holds a lock before resuming the thread, wherein the lock for a resource is acquired in the critical section of the thread; and means for executing roll back of the critical section of the thread after preemption when the user-level state of the thread indicates restart in absence of the lock held by the thread, else when the user-level state indicates the threads holds the lock returning to a point of preemption, resuming execution of the thread and disabling checking the user-level state for the lock.

* * * * *